(12) United States Patent
Gohl

(10) Patent No.: US 10,147,594 B2
(45) Date of Patent: Dec. 4, 2018

(54) DETERMINING DEVICE FOR HYDROCARBON EMISSIONS OF MOTORS

(71) Applicant: Verwaltungsgesellschaft für Emissionsanalyse UG (haftungsbeschränkt), Hamburg (DE)

(72) Inventor: Manfred Gohl, Escheburg (DE)

(73) Assignee: Verwaltungsgesellschaft für Emissionsanalyse UG (haftungsbeschränkt), Hamburg (DE)

( * ) Notice: Subject to any disclaimer, the term of this patent is extended or adjusted under 35 U.S.C. 154(b) by 0 days.

(21) Appl. No.: 14/902,443

(22) PCT Filed: Jun. 18, 2014

(86) PCT No.: PCT/EP2014/062864
§ 371 (c)(1),
(2) Date: Dec. 31, 2015

(87) PCT Pub. No.: WO2015/000704
PCT Pub. Date: Jan. 8, 2015

(65) Prior Publication Data
US 2017/0011902 A1    Jan. 12, 2017

(30) Foreign Application Priority Data

Jul. 3, 2013   (DE) .................. 20 2013 005 959 U

(51) Int. Cl.
*H01J 49/40* (2006.01)
*H01J 49/32* (2006.01)
(Continued)

(52) U.S. Cl.
CPC ........... *H01J 49/40* (2013.01); *G01M 15/102* (2013.01); *H01J 49/00* (2013.01); *H01J 49/322* (2013.01)

(58) Field of Classification Search
CPC ........... H01J 49/00; H01J 49/40; H01J 49/322
See application file for complete search history.

(56) References Cited

U.S. PATENT DOCUMENTS 2,939,952 A   6/1960  Paul et al.
4,121,455 A * 10/1978  Haslett .................. G01F 1/704
                                             73/861.04
(Continued)

FOREIGN PATENT DOCUMENTS

DE   102010056152   7/2011
DE   102012203150   10/2012
(Continued)

OTHER PUBLICATIONS

Gohl, M. et al., "Development and Application of a New Mass Spectrometer Based Measurement System for Fast Online Monitoring of Oil Emission in the Raw Exhaust Gas of Combustion Engines", Powertrain & Fluid Systems Conference & Exhibition; San Diego, California; Oct. 21-24, 2002; 12 pages.

(Continued)

*Primary Examiner* — Nicole Ippolito
*Assistant Examiner* — Sean Luck
(74) *Attorney, Agent, or Firm* — Morrison & Foerster LLP

(57) ABSTRACT

A determination device for hydrocarbon emissions of a thermal engine including an inspection probe for removing a sample volume from a liquid, a measurement channel for conducting the sample volume via an ion source apparatus to a broadband measurement apparatus that is configured to determine a spectrum to be measured in one step, wherein the ion source apparatus is configured for soft ionization and the measurement apparatus forms an intensity signal sequence across the mass spectrum and is configured as a simultaneously measuring "time-of-flight" detector or as a (Continued)

"double-focusing sector field mass spectrometer in Mattauch-Herzog geometry."

18 Claims, 4 Drawing Sheets

(51) Int. Cl.
*H01J 49/00* (2006.01)
*G01M 15/10* (2006.01)

(56) References Cited

U.S. PATENT DOCUMENTS

| | | | | |
|---|---|---|---|---|
| 4,372,155 | A * | 2/1983 | Butler | F02B 77/086 73/114.72 |
| 6,462,335 | B1 * | 10/2002 | Kato | H01J 49/04 250/281 |
| 6,617,771 | B2 | 9/2003 | Amirav | |
| 2002/0030159 | A1 * | 3/2002 | Chernushevich | H01J 49/004 250/287 |
| 2002/0074490 | A1 * | 6/2002 | Umemura | H01J 49/04 250/288 |
| 2006/0071665 | A1 * | 4/2006 | Blake | B82Y 30/00 324/464 |
| 2006/0097143 | A1 * | 5/2006 | Franzen | G01N 33/6851 250/282 |
| 2008/0210855 | A1 * | 9/2008 | Gohl | H01J 49/4215 250/282 |
| 2009/0095902 | A1 * | 4/2009 | Robinson | H01J 49/145 250/287 |
| 2009/0218482 | A1 * | 9/2009 | Muehlberger | H01J 49/162 250/282 |
| 2010/0032559 | A1 * | 2/2010 | Lopez-Avila | H01J 49/162 250/282 |
| 2011/0015590 | A1 | 1/2011 | Svedman et al. | |
| 2011/0240841 | A1 * | 10/2011 | Lange | H01J 49/0036 250/282 |
| 2011/0248161 | A1 * | 10/2011 | Takeshita | H01J 49/004 250/287 |

FOREIGN PATENT DOCUMENTS

| | | |
|---|---|---|
| JP | 2001-283768 | 10/2001 |
| JP | 2002-250716 | 9/2002 |
| JP | 2004-354339 | 12/2004 |
| JP | 2011-28926 | 2/2011 |
| WO | WO-2005/066605 | 7/2005 |
| WO | WO-2015/000704 | 1/2015 |

OTHER PUBLICATIONS

International Search Report and Written Opinion, dated Oct. 27, 2014, directed towards PCT Application No. PCT/EP2014/062864; 20 pages.

International Preliminary Report on Patentability dated Jan. 5, 2016, directed towards PCT Application No. PCT/EP2014/062864; 8 pages.

Vestal. (2001). "Methods of Ion Generation," *Chem. Rev.* 101:361-375.

* cited by examiner

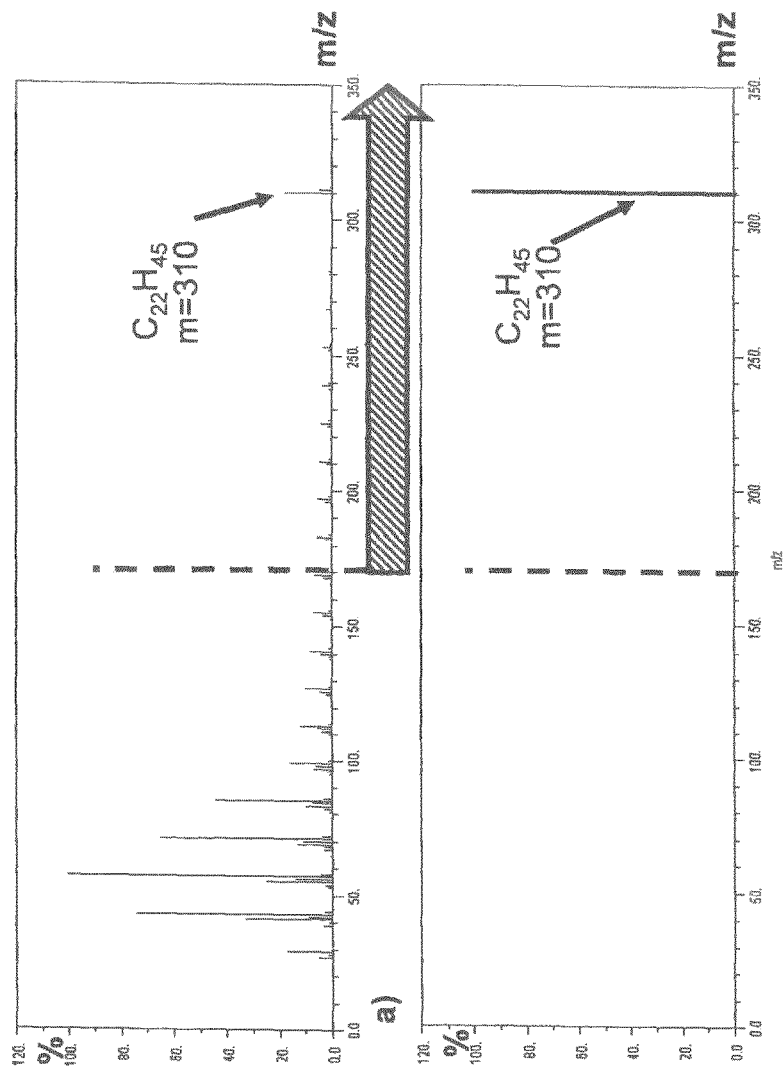
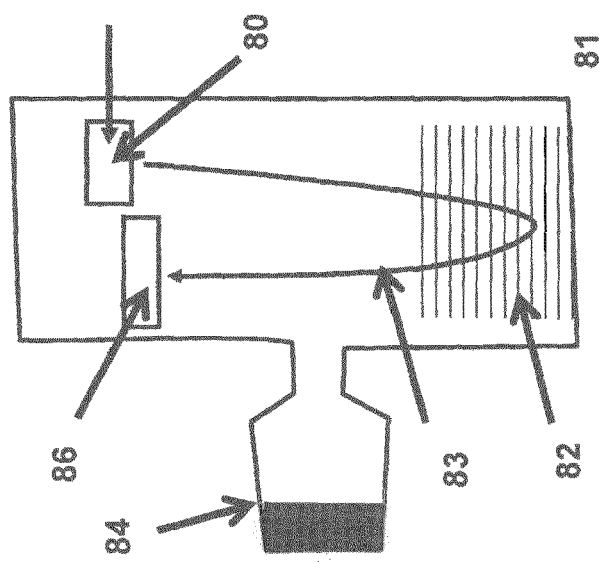
Fig. 3
Fig. 4

DETERMINING DEVICE FOR HYDROCARBON EMISSIONS OF MOTORS

REFERENCE TO RELATED APPLICATIONS

This application is a national stage application under 35 USC 371 of International Application No. PCT/EP2014/062864, filed Jun. 18, 2014, which claims priority to German Application No. 20 2013 005 959.1, filed Jul. 3, 2013, the entire contents of which are incorporated herein by reference.

FIELD OF THE INVENTION

The invention relates to a determination device for hydrocarbon emissions, as originate in particular from engines. The determination device comprises a probe for taking a sample quantity, a measuring channel, and a measuring unit. In this case, this is a broadband measuring unit for determining the hydrocarbons over an entire mass spectrum.

BACKGROUND OF THE INVENTION

The reduction of harmful emissions from engines or other thermal engines plays a significant role in fulfilling environmental protection efforts, which are becoming larger and larger. This relates to emissions originating directly from the combustion process, on the one hand, but also emissions which originate from secondary procedures in or on the engine, on the other hand. In this case, this can relate to externally active emissions, on the other hand, but also procedures inside the engine can be included in this case, for example, the fuel introduction into the lubricant oil or the recirculation of blow-by gases into the combustion chamber. To be able to reduce the emissions, it is primarily necessary to detect and evaluate the actually occurring emissions. In this case, in particular lubricant oil emissions and unburned hydrocarbons are significant. These have to be able to be measured rapidly with a high level of accuracy, to also be able to depict internal engine procedures with sufficient dynamic response.

Various measurement systems are known in the prior art. The unburned hydrocarbons in the exhaust gas are determined with a high level of chronological resolution by flame ionization detectors. This method can claim the advantage that it is less complex. However, it is not specific by its nature, i.e., a determination of a mass spectrum of the detected molecules cannot be performed. Therefore, this method is excessively coarse and does not fulfill the modern demands with respect to an accurate assignment of the hydrocarbons according to fuel and oil fractions.

Mass spectrometers are used for accurate characterization of hydrocarbons. They consist of an ion source, a mass analyzer, and a detector.

The chronological resolution of the system is substantially also determined by the mass analyzer.

In a known embodiment, this mass analyzer is embodied as an electrical quadrupole, to which a voltage source is connected, so that a periodically oscillating electrical field arises (U.S. Pat. No. 2,939,952). Because of the field, only ions having determined, specific mass/charge ratio run on stable paths, all others are unstable and are eliminated. A time-consuming sequential measurement of the individual masses (scanning) is necessary to generate a mass spectrum. The realistic measurement time for generating a spectrum of 50 to 550 atomic mass units is 500 ms.

In time-of-flight mass spectrometers (TOF-MS) (DE 10 2012 203 150 A1), different ionic species of a sample are accelerated in an electrical field. Subsequently, the ions pass through a flight route. The different velocities of the various ionic species have the result that the ions having different mass-charge ratio separate with respect to the movement direction. At the end of the mass analyzer, the ions fall on the ion detector, which measures the frequency of the successive ions simultaneously. A time-of-flight spectrum in the range of 50 to 550 atomic mass units can be recorded in less than 20 μs. To achieve better mass accuracy and detection limit, a mass spectrum is calculated in 1 ms from multiple time-of-flight spectra.

If a double-focusing sector field mass spectrometer in Mattauch-Herzog geometry is used (DE 10 2010 056 152 A1), the energy bandwidth of the ion beam is reduced in the electrostatic analyzer, to achieve a high resolution of the mass separation in the following magnetic field. All ionic masses can be depicted simultaneously in one focal plane due to the geometry. A planar detector enables the simultaneous detection of the complete mass spectrum. A time-consuming sequential measurement is not necessary.

A typical technology for ionization of molecules in mass spectrometry is electron impact ionization (EI) at 70 eV. Depending on the high ionization energy in this hard ionization method, fragmentation of the molecules into smaller fractions occurs, which cannot be unambiguously assigned to the substances in a mixture.

The inadequacies of this technology have resulted in the development of soft ionization methods, in which essentially molecular ions are generated. Different technologies based on chemical ionization (CI), field ionization (FI), and photoionization (PI) have been developed. The use of matrix-assisted laser ionization (MALDI) and electrospray ionization (ESI) is widespread for polar molecules.

In the case of photoionization, molecular ions can be generated by targeted selection of the photon energy. The use of UV radiation results in a high level of selectivity in the case of aromatic hydrocarbons and is generated, for example, by pulsed lasers (REMPI; laser-based resonance enhanced multi-photon ionization). The detection of organic materials can be performed by single photon ionization (SPI) using VUV radiation (vacuum ultraviolet).

A further soft ionization method is based on taking samples using supersonics (SMB, supersonic molecular beam) and subsequent ionization of the energetically cold molecules using electron impact ionization (cold EI), which is described in U.S. Pat. No. 6,617,771 B2.

The required combination of detection limit, discrimination power, selectivity, and measurement speed of the known systems do not correspond to the demands currently placed on the observation of hydrocarbon emissions in dynamic engine procedures.

An improved method for determining the lubricant oil content in the exhaust gas is known from WO 2005/066605 A2. According to this, the exhaust gas mixture taken as a sample is supplied to an ion source and, after ionization, supplied to a combination comprising a mass spectrometry filter unit, which is designed as a multipole, and a detector unit.

The filter unit is embodied so that a specific transmission range is defined for mass-charge numbers to be transmitted. A lubricant oil fraction to be measured is therefore defined. The measurement over this fraction is carried out using the mass spectrometer as a global measurement of the intensity in one step simultaneously over the entire transmission range. This measurement system enables outstandingly rapid measurement with a measurement time of 1 ms over a settable measurement range. The dynamic response of this measurement system is good, but the spectral resolution is not completely satisfactory.

SUMMARY OF THE INVENTION

The invention is based on the object of achieving an improvement, proceeding from the last mentioned measurement system, such that an improved resolution is achieved with improved dynamic response at the same time.

The solution according to the invention are in the features as broadly described below. Advantageous refinements are described in the detailed embodiments below.

In a determination device for hydrocarbon emissions of a thermal engine, in particular an engine, having a sampling probe, which is designed to take a sample quantity from a fluid, a measuring channel, which conducts the sample quantity via an ion source unit to a measuring unit, and the measuring unit, which is embodied as a broadband measuring unit for determining a mass spectrum over a definable range, it is provided according to the invention that the ion source unit is designed so that a soft ionization takes place, and the measuring unit is embodied as a simultaneously measuring detector, for example, according to the "time-of-flight" type or as a "double-focusing sector field mass spectrometer in Mattauch-Herzog geometry", which forms an intensity signal sequence over the mass spectrum.

Firstly, several terms which are used will be explained hereafter:

A fluid is understood as both a liquid and also a gaseous material. The gaseous material can be in particular exhaust gas or blow-by gas, and the liquid material can be in particular a large volume, such as the content of an oil pan, or a thin-layer volume, such as a wall film.

A mass spectrum is understood as a specific mass range, which is defined by a lower limit and an upper limit with respect to the mass/charge ratio.

A simultaneous measurement is understood as a rapid measurement over a determined mass range, which can be carried out without time-consuming sequential measurement (scanning) of the individual masses.

An intensity sequence is understood as a sequence of intensity signals, wherein an intensity signal is such a signal which describes the intensity of the occurrence of a specific mass/charge ratio within the mass spectrum.

For example, if a spectrum of 170 to 550 m/z is measured, the intensity sequence thus comprises 381 intensity signals, specifically one for each value within the spectrum from 170 to 550 m/z.

The invention is based on the combination of two measures. The first measure is to provide a "soft" ion source.

In contrast to the ionization unit used in the generic measurement system, a fragmentation of, in particular, the long-chain molecules in the sample quantity is avoided using the soft ion source provided according to the invention. This is the definition of "soft" in the scope of the present application, specifically that the ionization energy is sufficiently small that fragmentation of the hydrocarbons to be studied, which are generally long-chain, does not occur. The total number of such molecules in the sample quantity is therefore maintained. This improves the accuracy of the measurement of the downstream broadband measuring unit, on the one hand, and by maintaining the molecules, the formation of fragments is prevented, on the other hand, as would otherwise arise as a consequence of the breaking apart of the long-chain molecules. These fragments result in artifacts during the measurement in the range of short-chain molecules, i.e., the presence of short-chain molecules is simulated, which were not originally contained in the sample quantity at all. To avoid the corruption of the measurement result by way of such artifacts, filter units are required in the prior art, which hide the shorter-chain molecule range. The invention avoids the use of such a filter. Therefore, not only is the shorter-chain molecule range depicted accurately, but rather the long-chain molecules to be measured are also completely maintained. The soft ion source therefore not only provides a better measurement signal in the range of the longer-chain molecules, but rather also expands the measurement range by way of the avoidance of artifacts due to fragments in the range of the shorter-chain molecules.

A rapid measurement over the entire spectrum range from short-chain up to the long-chain molecules is achieved using the broadband measuring unit by using a detector according to the "time-of-flight" type or the "double-focusing sector field mass spectrometer in Mattauch-Herzog geometry". These detectors can record the entire spectrum in less than 1 ms "at once" because of the construction, and at the same time generate an intensity signal in each case for the individual molecule sizes within the recorded spectrum. An intensity signal sequence therefore results, which depicts the occurring molecules over the entire spectrum, and with a high level of dynamic response. In that a separate intensity signal is provided for each individual molecular mass thanks to this detector type, the total material quantity can be ascertained reliably and rapidly by simple summation. Using the conventionally used measuring unit, as was provided in the generic prior art, a separate intensity could not be associated with each of the individual molecular masses. Therefore, the total material quantity could only be determined imprecisely. Such a fine allocation of the intensity over the spectrum can now be performed using the detector of the type provided according to the invention.

However, this fine allocation would be worthless solely per se, since in the case of the conventional ionization, the longer-chain molecules are destroyed by fragmenting and artifacts are thus automatically generated by the formation of shorter-chain fragments, which significantly corrupt the measurement result. The invention has recognized that the fine resolution achieved using this detector is only fully applied when it is combined with the soft ion source according to the invention. This does not have an example in the prior art.

The ion source unit is advantageously designed for ionization at an energy of less than 50 eV, but preferably at least at an energy of 5 eV. Therefore, on the one hand, reliable ionization of the molecules of the sample quantity to be analyzed is achieved, however, on the other hand, a fragmentation, in particular of longer-chain molecules, is reliably prevented.

An embodiment of the ion source unit according to the principle of chemical ionization (CI), photoionization (PI), or cold electron impact ionization (cold EI) is particularly advantageous.

The detector of the "time-of-flight" type preferably has an ion mirror, which is advantageously embodied as a reflectron. A reflection of the ion beam can therefore be achieved, so that with unchanged overall length of the detector, the length of run of the ion beam is approximately doubled. Both the sensitivity and also the resolution can thus be increased.

An embodiment of the detector having an orthogonal flight tube is particularly preferred in this case. This embodiment can win special advantages with respect to resolution fineness and resolution dynamic response.

In a proven embodiment, the detector of the "time-of-flight" type works together with an analysis unit, which is designed to determine a spectrum over a preferably preselectable range. Therefore, automated analysis can be carried out of the intensity signal sequence, which is generated by the detector with high dynamic response and resolution. The intensity signal sequence can be produced in this case based on time, however, it is also conceivable that it is produced based on a magnetic field using a "double-focusing sector field mass spectrometer in Mattauch-Herzog geometry".

The analysis unit preferably comprises a quantity computer, to which an intensity vector and a mass spectrum are applied, and which links them via a preferably settable analysis field. Therefore, a total quantity can be determined over the mass spectrum from the intensity signal sequence in an automated manner. Thus, one is typically interested in a determination over the entire spectrum. However, it can also be provided that the quantity computer of the analysis unit is capable of subfields. Therefore, specific ranges can be analyzed separately, for example, high-volatility lubricant oil emissions having the moderate length molecules thereof and low-volatility fractions having longer molecules. Furthermore, a classifier is preferably provided for the analysis unit, which, for example, analyzes a range for longer-chain molecules (above 170 m/z) for lubricant oil emissions in gasoline engines and analyzes below this value for unburned hydrocarbons from fuel emissions.

The analysis unit particularly advantageously has a classification module for determining a type of fuel or lubricant oil. Therefore, selectable ranges can be related to one another, which can be used for the analysis of different fuels, lubricant oils, or additive components with respect to the specific basic building blocks of the material groups thereof, for example, with reference to the lubricant oil content of esters or PAO (polyalphaolefin) or the content of biofuels, for example, fatty acid methyl ester (FAME), rapeseed oil methyl ester (RME), and ethanol.

Auxiliary detectors, which respond to a predetermined type of material, can advantageously be provided in particular with reference to components such as, for example, esters, PAO, and ethanol.

To take the sample quantity, the sampling probe is preferably designed as an exhaust gas probe and/or fluid probe. The exhaust gas probe can be arranged in the combustion chamber or in the directly adjoining region of the exhaust gas train. The fluid probe can also be arranged in the combustion chamber, but can advantageously also be provided in the region of a lubricant oil container (for example, the oil pan). A mode switchover switch is preferably provided, which switches the analysis unit over between operation using the exhaust gas probe or the fluid probe as the sampling probe. Therefore, it is possible to switch back-and-forth between the different operating modes using the same analysis unit.

Not only can a statement be made about the emissions via the exhaust gas, but rather also, for example, about emission components in the lubricant, in particular fuel introduced into the lubricant oil of the engine.

The invention furthermore extends to a corresponding method, having the steps of taking a sample quantity from a fluid by means of a sampling probe, transferring the sample quantity to a measuring unit, ionizing the sample quantity by means of an ion source, characterized by carrying out the ionization as a soft ionization and determining an intensity signal sequence over a mass spectrum by determining flight times for the individual ion masses or by determining the deflection of the ion masses in a magnetic field, wherein the above-described determination device is advantageously used.

The invention is explained in greater detail hereafter with reference to the appended drawing, in which an advantageous exemplary embodiment is shown.

BRIEF DESCRIPTION OF THE DRAWINGS

FIG. 3 shows a view of a detector for the device according to FIG. 1;

FIGS. 4a, b show a mass spectrogram to illustrate the effect of the ionization source;

DETAILED DESCRIPTION OF THE INVENTION

Figure 2:
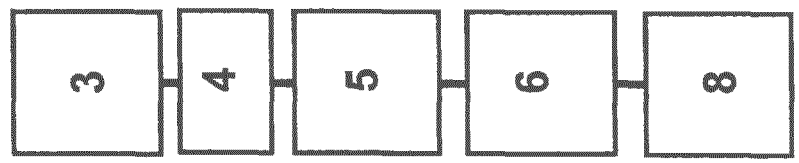
FIG. 2 shows a block diagram of the device.
Figure 1:
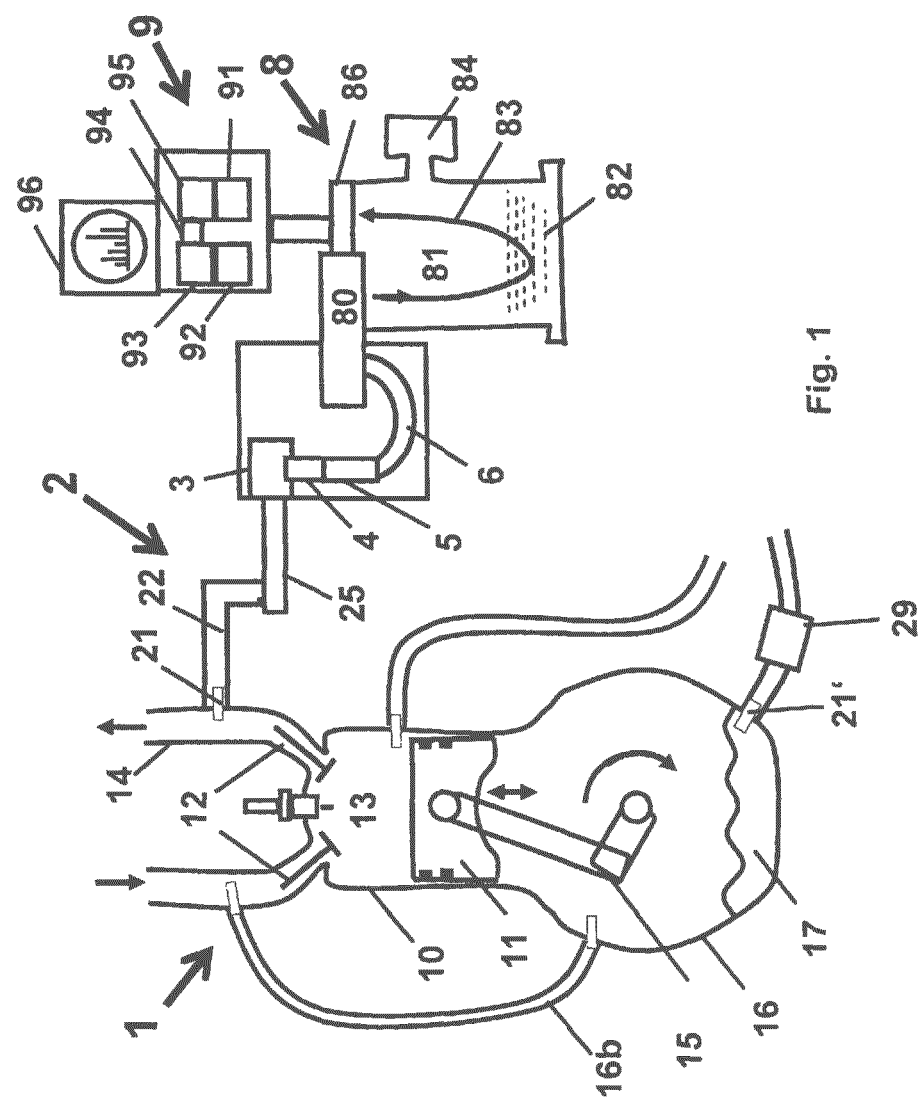
FIG. 1 shows an overview illustration of a device according to one exemplary embodiment of the invention.

FIGS. 1 and 2 show an exemplary embodiment of a determination device according to the invention. The determination device is used to determine oil emissions and emissions of unburned hydrocarbons (HC), which originate from an internal combustion engine. The illustrated exemplary embodiment relates to an internal combustion engine according to the reciprocating piston principle, however, the exemplary embodiment of the invention is not restricted thereto.

An internal combustion engine, which is identified in its entirety with the reference sign 1, has a cylinder 10 having a piston 11 mounted so it is movable up and down therein. A combustion chamber 13 is formed above the piston, to which fresh gas is supplied via valves 12 and from which exhaust gas is discharged into an exhaust gas manifold 14. Below the cylinder 10 having the piston 11, a crankcase 16 is arranged, which comprises a crankshaft drive 15 for the piston 11 and a crankcase ventilation 16b for discharging blow-by gases. An oil pan 17 for lubricant oil is located at the bottom of the crankcase 16.

The internal combustion engine is embodied as conventional per se, so that a detailed description can be omitted in this regard. It is to be noted that essentially the following emissions of the internal combustion engine occur and are depicted as follows in the mass spectrum (see also FIG. 5):

1. High-volatility exhaust gas components, such as nitrogen, nitrogen oxides, oxygen, carbon monoxide, carbon dioxide, water, and argon. These components are comparatively light and have a specific mass (mass divided by valence m/z), which is in the range of <50 m/z.

2. Unburned hydrocarbons from the fuel, which typically consist of at most 10 carbon atoms in the case of gasoline engine fuels. Ions formed therefrom have a specific mass of <170 m/z.

3. Hydrocarbons from the lubricant oil, which create ions having a specific mass of >170 m/z. One example of this is docosane having 22 carbon atoms and 45 hydrogen atoms and a specific mass of 310.

An exhaust gas probe 2, having a probe head 21 at the exhaust gas manifold 14, is connected to the engine 1. From the probe head 21, a sample quantity moves via a transfer capillary 22 to a transfer unit 25 having a vacuum pump. The sample quantity is then supplied to an ion source unit 3, which is designed so that the sample quantity exhaust gas stream flowing in through the capillary 22 is ionized. The ion source unit 3 is embodied as an ionizer according to the principle of chemical ionization (CI), photoionization (PI), or cold electron impact ionization (cold EI), and is designed so that soft ionization having an ionization energy of at most 50 eV takes place.

A prefilter 4 is arranged directly adjoining in the flow direction. It is furthermore used to transfer the ions into the downstream high vacuum region having the mass filter 5. Therefore, a first mass filter 5, and a collision cell 6 behind it, directly adjoins the prefilter 4. The mass filter 5 is used to filter out ions having an undesired component. The mass filter 5 is designed as a quadrupole filter for this purpose. The construction of quadrupole filters in general is known in the prior art and does not have to be explained in greater detail here.

In the flow direction after the collision cell 6, a detector 8 is arranged as a measuring unit, which is embodied as a "time-of-flight" type or as a "double-focusing sector field mass spectrometer in Mattauch-Herzog geometry". An alignment value unit 9 works together with the detector 8.

The "time-of-flight" detector 8 is embodied in the construction having orthogonal flight tube. It comprises an accelerator unit 80, which accelerates the ions on a parabolic trajectory in the flight tube 81. The flight tube 81 is evacuated by means of a high vacuum pump 84. The ions firstly move toward the opposite end, where a reflectron is arranged as an ion mirror 82. The ions are thus reflected and run back again in the flight tube 81, until they are incident on an electron multiplier 86. This multiplier outputs a signal pulse, which marks the time which the respective ion requires to run through its ion path. Heavy ions having a high specific mass (m/z) move on a trajectory and require a longer time for this purpose than lighter ions having a low specific mass. This means that ions having greatly varying mass can be introduced at the same time into the "time-of-flight" detector 8, and depending on the frequency of the occurrence of the respective ions, an intensity signal is output, more precisely is output having an intensity signal sequence, wherein firstly the intensity signals for the ions having low specific mass and subsequently those having successively higher specific mass are output.

As a result, a broadband measurement "at once" having high resolution is then enabled. The measurement signal thus obtained is an intensity sequence signal and is transmitted to the analysis unit 9. The detector 8 is made capable in this way of detecting the complete spectrum of the molecular ions with high dynamic response simultaneously, namely within less than 20 μs. Therefore, more than 5000 spectra per second are available for analysis.

The analysis unit comprises a quantity computer 91, to which the intensity sequence signal and a signal for the mass spectrum are applied. The analysis unit furthermore comprises a classifier 92, which is designed to determine fractions of the lubricant oil or of unburned hydrocarbons from the fuel or additive components in the ascertained mass spectrum. Furthermore, the analysis unit comprises a classification module 93 for determining the type of fuel and oil. The classification module 93 is designed in this case to evaluate specific components with respect to the frequency of occurrence thereof and then to perform an association. The components can be in particular ethanol and PAO (polyalphaolefins) or specific esters. The classification module 93 is preferably provided with an ester detector 94 for this purpose. Furthermore, a threshold value switch 95 is advantageously provided, which outputs a signal upon the occurrence of pre-selectable events, for example, the occurrence of emissions of a specific type of oil.

The effect of the ion source unit 3 is visualized in FIG. 4. In the prior art, ionization is performed using comparatively high energy, so that long-chain molecules are split, such as docosane C22H45, which is shown as an example, having specific mass of 310. It can be seen that fragmenting occurs due to the prior art in the case of electron impact ionization at high energy, wherein many fragments are located outside the measurement range for lubricant oil, i.e., below a specific mass of 170 m/z. Only very few molecular ions remain in the actual measurement range for the lubricant oil (range>170 m/z). Therefore, a substantial signal loss results due to the fragmentation, since the fragments fall out of the actual measurement range for the lubricant oil. In the illustrated example in FIG. 4a, the signal loss is almost 80%. This is avoided using the soft ion source 3 according to the invention. As can be recognized well from FIG. 4b, the long-chain molecule is not fragmented, so that the molecular ions in the measurement range are completely maintained. A substantially more powerful signal therefore results and no fragments are formed.

Figure 5:
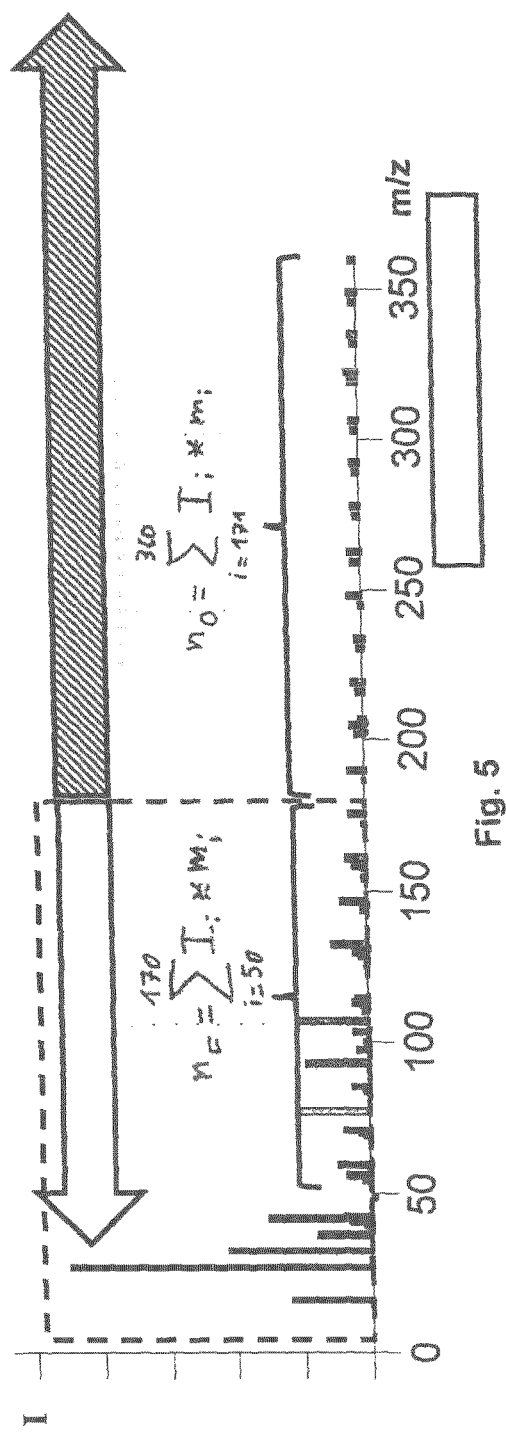
FIG. 5 shows a mass spectrogram to illustrate the determination of a total quantity.

A summation over the measurement range is performed to determine the total material quantity in relation to the lubricant oil emissions. With respect to the lubricant oil, the range of those having specific masses of >170 is of interest (lubricant oil range). For the determination, a product is formed from the intensity for a determined specific mass multiplied by the respective specific mass. By summation over the entire range, the total material quantity for the lubricant oil range hereby results. This lubricant oil range is shown in FIG. 5 by the shaded arrow. The total quantity of the lubricant oil nO is calculated by means of the illustrated formula. This applies accordingly to unburned hydrocarbons (HC) from the fuel. The range below a specific mass of 170 is decisive for them (fuel range). It is illustrated by the non-shaded arrow in FIG. 5. For the determination, a sum is formed in a similar manner from the product of the intensity signal for the respective specific mass multiplied by the respective molecular mass. Therefore, the total material quantity nF is determined for unburned hydrocarbons from fuel. The total material quantity of the hydrocarbons in the exhaust gas mixture can be determined by addition of the two total material quantities nO for oil and nF for unburned hydrocarbons from fuel. This amount is particularly important for the certification with regard to fulfilling environmental standards.

Figure 6:
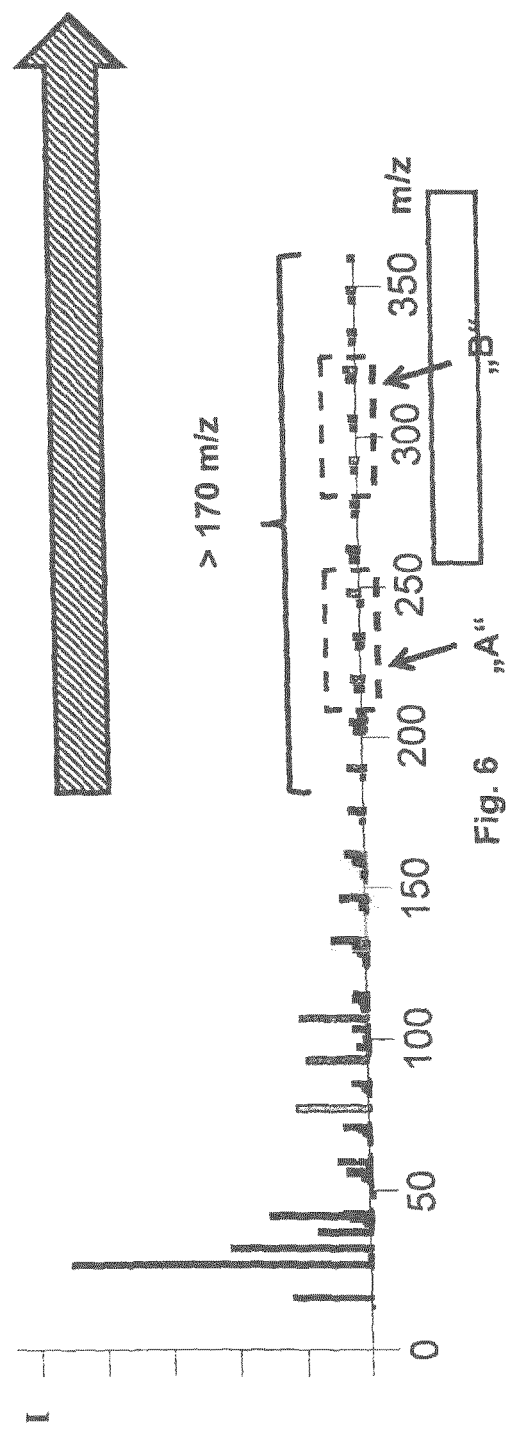
FIG. 6 shows a mass spectrogram for the determination of various types of oil.

Thanks to the fine resolution in the spectrum while avoiding fragmentation, it can be determined, with the aid of separate oil circuits having different lubricant oils, which assembly of an engine causes the lubricant oil emission. Reference is made in this case to FIG. 6. Two non-overlapping fields are shown therein, which are identified with "A" and "B". These are two different lubricant oils in this case, which differ with respect to the characteristic material groups thereof, in particular with respect to the polyalphaolefins (PAO) and the esters thereof.

Lubricant oil A is such an oil for the engine 1 itself, if the lubricant oil B is such an oil for a turbocharger (not shown) of the engine. By way of the application of the classification module 93, it can be determined in the spectrum with which intensity which lubricant oils occur and therefore an association of the lubricant oil emission with the respective assembly can be performed. If it is a particularly critical component, such as the turbocharger, a corresponding signal can thus be output via a visual and/or acoustic output unit 96.

Figure 7:
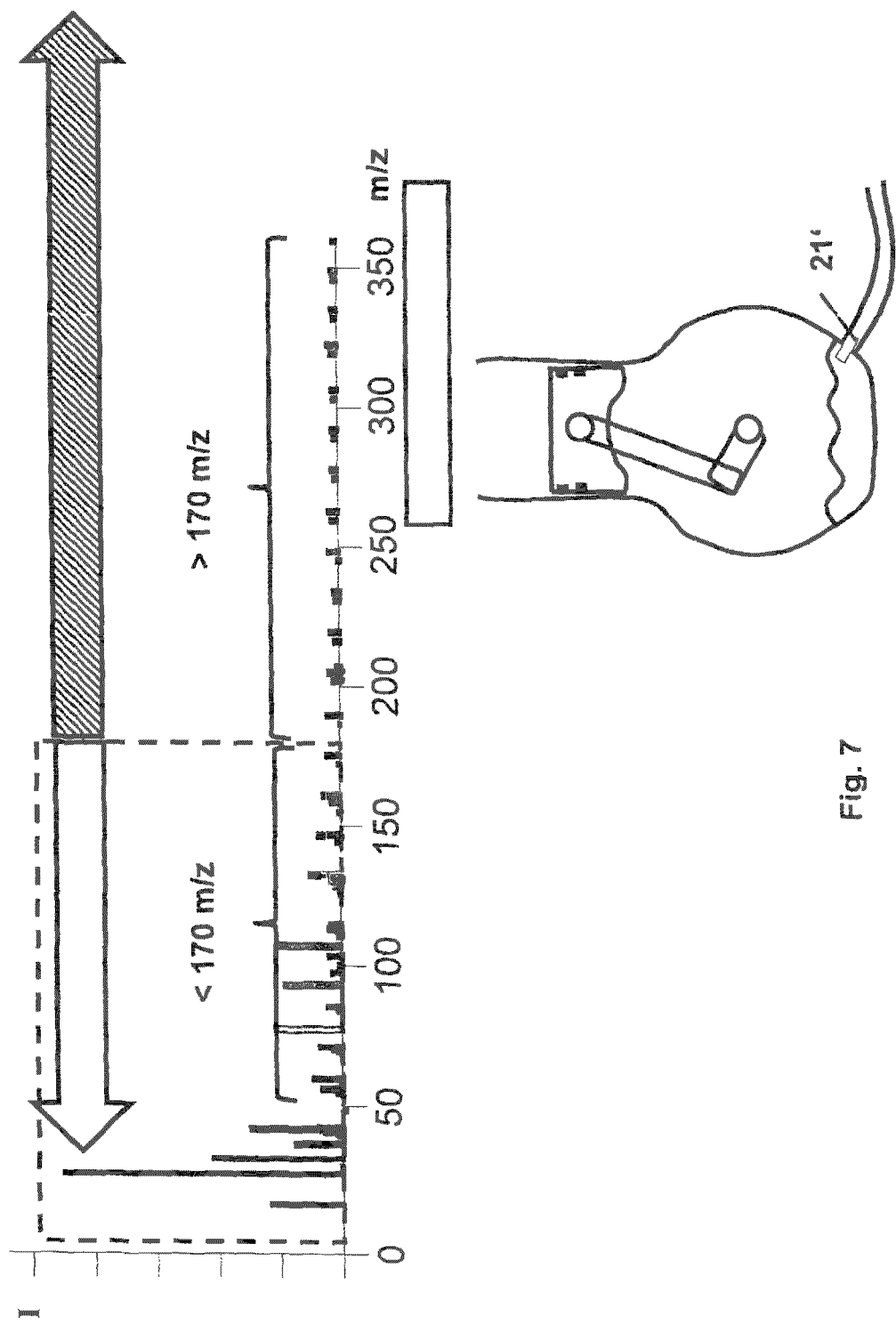
FIG. 7 shows a mass spectrogram for the determination of fuel introduced into oil.

In a variant shown in FIG. 7, the size of the fuel fraction in the lubricant oil can also be determined. As also above, in this case, those molecular ions having lower mass, that is to say, having a specific mass of <170 m/z are defined as unburned hydrocarbons from fuels and the heavier ones, having a specific mass of greater than 170 m/z, are defined as lubricant oil components. To determine the fuel introduced into the lubricant oil, sampling is performed by means of a probe head 21', which is mounted on the oil pan 17. A mode switchover switch 29 switches over thereto, so that the sample quantity is then supplied to the ion source 3 from the exhaust gas probe 21' and not from the exhaust gas probe 21. In the same manner as described above, the fuel introduced into the lubricant oil can thus be analyzed rapidly and with a high level of accuracy.

The invention claimed is:

1. A determination device for hydrocarbon emissions of a thermal engine, the determination device comprising:
   a sampling probe for taking a sample quantity from a fluid,
   a measuring channel configured for conducting the sample quantity via an ion source unit to a broadband measuring unit such that hydrocarbons from unburned portions of a fuel of the thermal engine and hydrocarbons from a lubricant oil of the thermal engine are conducted to the broadband measuring unit,
   wherein the ion source unit is configured for soft ionization, and
   wherein the broadband measuring unit is configured to determine a spectrum of both the hydrocarbons from unburned portions of the fuel of the thermal engine and the hydrocarbons from the lubricant oil of the thermal engine simultaneously in one step in less than 1 ms, and to form an intensity signal sequence over the spectrum, the broadband measuring unit being configured as a simultaneously measuring time-of-flight detector or as a double-focusing sector field mass spectrometer in Mattauch-Herzog geometry.

2. The determination device of claim 1, wherein the ionization unit is configured for ionization at less than 50 eV.

3. The determination device of claim 1, wherein the ion source unit is configured for chemical ionization (CI), photoionization (PI), or cold electron impact ionization (cold EI).

4. The determination device of claim 1, wherein the detector comprises an ion mirror.

5. The determination device of claim 1, wherein the detector comprises an orthogonal flight tube.

6. The determination device of claim 1, wherein the detector works together with an analysis unit that is configured to determine a spectrum over a selectable base.

7. The determination device of claim 6, wherein the analysis unit comprises a quantity computer configured to link the intensity sequence signal and a mass spectrum via a settable analysis field.

8. The determination device of claim 7, wherein the quantity computer of the analysis unit is configured for subfields.

9. The determination device of claim 6, wherein the analysis unit comprises a classification module for determining a type of oil, a type of fuel, or specific additive components.

10. The determination device of claim 6, wherein the analysis unit comprises an auxiliary detector for a predetermined type of material.

11. The determination device of claim 6, wherein the analysis unit comprises a classification module for weighting various fields and subfields.

12. The determination device of claim 11, wherein the analysis unit works together with a threshold value switch that outputs a signal upon the occurrence of a preselectable emission spectrum.

13. The determination device of claim 6, comprising a mode switchover switch for switching over between exhaust gas probe operation and fluid probe operation.

14. The determination device of claim 2, wherein the ionization unit is configured for ionization at a minimum of 5 eV.

15. The determination device of claim 4, wherein the ion mirror is a reflectron.

16. The determination device of claim 6, wherein the selectable base is based on time or on a magnetic field.

17. The determination device of claim 10, wherein the predetermined type of material comprises at least one of ester, ethanol, or polyalphaolefins.

18. The determination device of claim 6, wherein the analysis unit comprises a classification module for weighting various fields or subfields.

* * * * *